Patented July 11, 1939

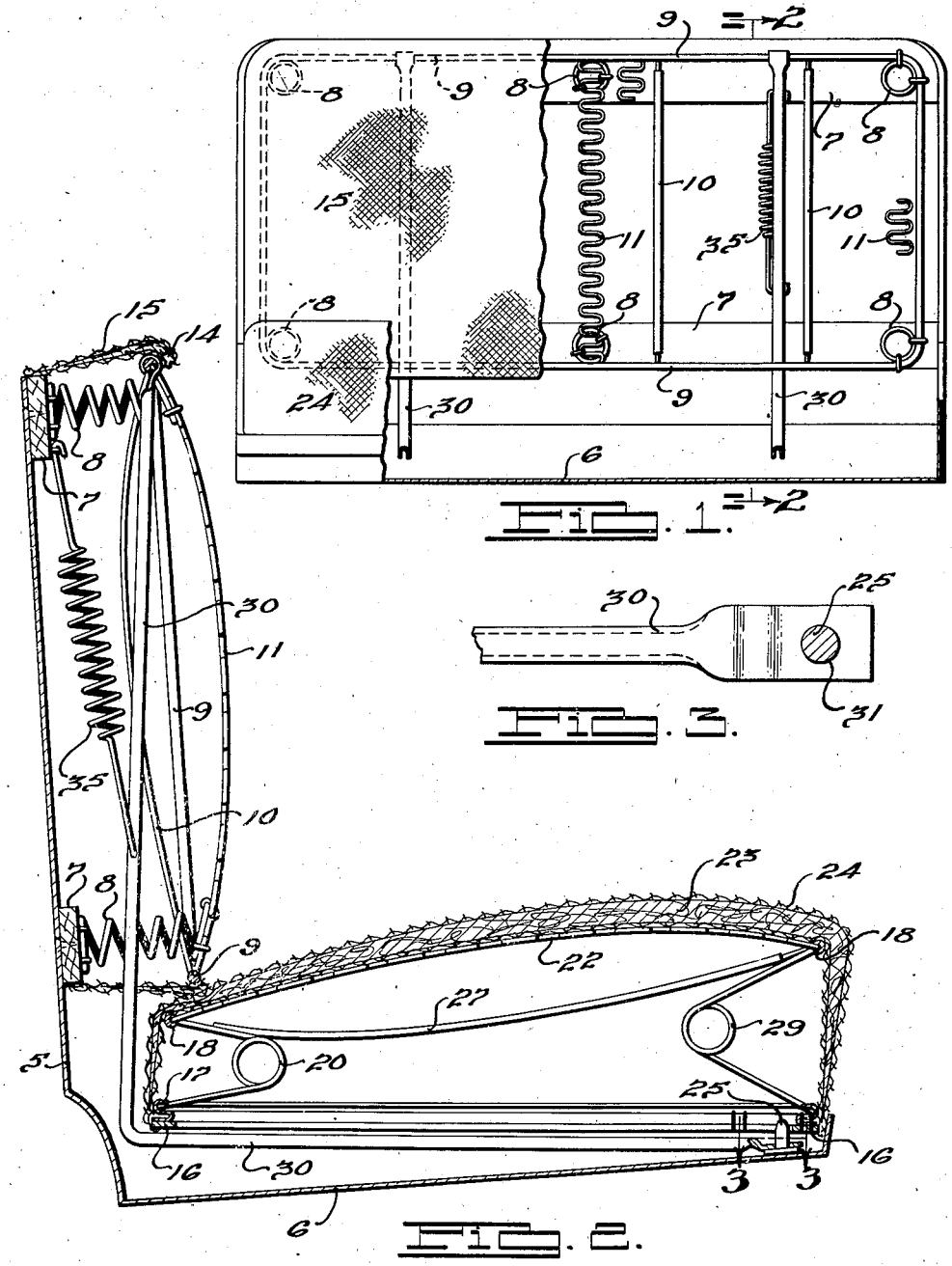

2,165,306

UNITED STATES PATENT OFFICE 2,165,306

VEHICLE SEAT

Frank M. Shanahan, Detroit, Mich., assignor to
The Murray Corporation of America, Detroit,
Mich., a corporation of Delaware Application September 28, 1936, Serial No. 102,923

9 Claims. (Cl. 155—53)

This invention relates primarily to seat constructions. More particularly it relates to a novel and improved form of seat construction having extremely high resilience and primarily adapted for use in automotive vehicles.

It is a primary object of the present invention to provide a seat construction in which a resilient cushion and a resilient seat back are together so connected that vertical movement of the seat cushion effects some corresponding vertical movement of the exposed surface of the seat back cushion. This particular result is inherently desirable inasmuch as the fabric material generally used for the purpose of covering automobile seats has a tendency to grip and engage the clothes of an occupant seated in the seat and substantial relative movement between the seat back and seat cushion has a pronounced tendency to displace the clothing of the occupant.

These inherent difficulties become extremely pronounced in the event that the cushion and seat back, which together make up the vehicle seat, are of such a nature that they have extremely high resiliency and consequently have very substantial relative movement with respect to each other.

Still further the present invention contemplates the construction of a seat construction having the above enumerated desirable features and in which the cushion of the seat is displaceably mounted as is conventionally desirable in automobile seats generally.

The present invention contemplates the provision of a seat back cushion comprising a pair of frames resiliently mounted with respect to each other, the surface frame including a plurality of springs which serve to provide a resilient surface therefor. The seat cushion likewise includes a pair of spaced resiliently connected frames, the upper frame including a plurality of spring elements providing a resilient surface for the seat cushion. The outer or forward frame of the seat back is connected to the base frame of the seat cushion in order that as downward movement of the seat cushion takes place a substantially corresponding downward movement of the forward seat back frame will take place.

It is a still further object of the present invention to provide a seat construction which is relatively simple, easily and conveniently manufactured, and which will inherently provide the advantages enumerated above.

Many other and further objects, advantages and features of the present invention will become clearly apparent from the following specification when considered in connection with the accompanying drawing forming a part thereof.

In the drawing:

Figure 1 is a front elevational view with parts in section and parts broken away illustrating a seat construction embodying the improvements of the present invention.

Fig. 2 is a transverse sectional view taken substantially on the line 2—2 of Fig. 1, illustrating in detail the relative position of the parts making up the improved seat construction, and the manner in which the same are mounted and interconnected.

Fig. 3 is an enlarged sectional view taken substantially on the line 3—3 of Fig. 2, illustrating in detail the manner in which the forward ends of the supporting slings are secured to the seat pan.

With more particular reference to the drawing, it will become clearly apparent that the herein described and illustrated form of the invention is merely illustrative of one form which the invention may take and which discloses a specific type of seat construction which embodies the improvements of the present invention and has been found particularly satisfactory for use in automotive vehicles.

In the specific form of the invention illustrated in the drawing the seat construction is shown as mounted in a framework including a relatively rigidly supported back section 5 which, at its lower end is secured to a seat pan or base support 6. This seat back portion 5 has permanently mounted thereon a rectangular framework 7 which may be constructed of wood, such as is conventional in the art, or may be formed of any suitable similar material having a configuration generally the same as that of the seat back cushion of which it is a part.

This seat back cushion frame 7 has mounted thereon a plurality of helical coil springs 8 which serve to resiliently support a border wire framework 9 which constitutes the upper or forward frame of the seat back cushion. The helical coil springs 8 serve to resiliently mount this frame 9 with respect to the seat back frame 7. The frame 9 is preferably formed from a single substantially continuous section of border wire such as is conventional in the art and serves to mount a plurality of vertically extending arcuately disposed sinuous spring elements 11. These spring elements 11 are preferably of the type shown and described in the patent to Kaden 2,002,399 issued May 21, 1935, and are formed of a plurality of similar adjacent lateral convolutions lying substantially in the same surface. The frame 9 may be transversely braced to maintain it in true rectangular shape by means of brace members 10 if desired.

The spring elements 11, as a whole, at the time of their formation, are tensioned to lie along arcs of substantially smaller radius than that in which they are disposed in the frame 9. Consequently, the spring elements 11 are each tensioned materially to add to their resilience. These elements are arranged side by side and together provide a relatively resilient surface for the seat back cushion, which resilience is in addition to the resilient support provided by the coil springs 8.

It will be appreciated that the seat back cushion construction as a whole may be covered with a suitable layer of padding material 14 and the padding material may be conveniently covered with a section of fabric finish material 15 in order to lend an attractive surface finish to the cushion construction as a whole.

It will be apparent that the coil springs 8 provide substantially resilient means for interconnecting the upper frame 9 with the base frame 7 of this cushion construction and consequent relative vertical movement of the upper frame 9 with respect to the base frame 7 may take place, resulting only in a distortion of the coil springs 8 within their elastic limits.

The cushion of the seat construction may be formed in a manner similar to the seat back cushion described above if desired, but in the particular embodiment of the invention illustrated in the drawing this seat cushion includes a base frame 16 which is generally rectangular in configuration and of a shape substantially the same as the cushion as a whole. This base frame has secured directly on the upper surface thereof a metallic sheet metal member 17 which extends continuously around the base frame and, in the form shown, is generally S shaped in cross section, thus providing an inwardly presenting channel extending entirely around the base frame. A generally rectangular border frame 18 forms the marginal edge of the upper portion of the seat cushion and this border frame 18 is preferably constructed of border wire such as is conventional in the art in constructions of this kind.

The upper or border frame 18 is resiliently mounted with respect to the base frame 16 by means of a plurality of jack springs 20, the upper ends of which are preferably crimped into the border wire 18 of the upper frame and the lower ends of which are preferably crimped into the inwardly presenting channel of the sheet metal member 17 of the base frame. These jack springs 20 serve to resiliently mount the upper frame with respect to the base frame of the seat cushion. The surface of the seat cushion is preferably formed of a plurality of arcuately tensioned sinuous spring elements 22, substantially similar in construction and arrangement to the arcuate sinuous spring elements 11 described above, and the frame 18 may likewise be transversely braced by brace members 27 if desired.

The marginal ends of these sinuous spring elements 22 may be conveniently crimped into the border frame 18 to lock them permanently in place and maintain them tensioned on the predetermined desired arc. The seat cushion construction as a whole is preferably covered with a layer of suitable padding material 23 and finished by stretching thereover a section of fabric finish material 24, which fabric finish material may conveniently be brought down on all sides of the cushion construction and secured to the rectangular frame 16 in any convenient manner such as is conventional in the art.

The forward portion of the seat cushion construction rests in the forward marginal edge of the seat pan 6 and is prevented from moving rearwardly therein by means of a pair of upstanding pins 25, which pins are rigidly mounted in the seat pan 6. The rear edge of the seat cushion is supported by means of a pair of slings 30 which are preferably formed of sheet metal bent to form a channel cross section, the upper ends of which slings are secured to the upper marginal frame member 9 of the seat back cushion. These slings 30 extend downwardly and underneath the seat cushion and forwardly to a point adjacent the forward edge thereof. The forward ends of the slings are flattened and provided with apertures 31 therein adapted to receive the pins 25.

These slings are of such length and configuration that they serve to maintain the rear portion of the seat cushion substantially spaced from the surface of the seat pan 6 at the rear portion thereof to allow for considerable downward movement of the entire rear portion of the cushion when a substantial amount of weight such as that of an occupant is disposed thereon. It will be appreciated that the coil springs 8 serve to some extent to resist this downward movement of the seat cushion as a whole, inasmuch as these coil springs serve to support the back border frame 9 in predetermined position.

The slings 30 are additionally supported by relatively strong tension coil springs 35, the upper ends of which are anchored to the frame 7 of the seat back cushion and the lower ends of which are anchored to the slings at a point above where the slings come in contact with the rear edge of the seat cushion. It will be readily apparent that these tension coil springs serve to resist downward movement of the slings and consequently resist downward bodily movement of the rear portion of the seat cushions as a whole.

From the foregoing it will be readily understood that inasmuch as the upper ends of the slings are mounted to the upper marginal frame member of the top frame of the seat back cushion that the entire forward surface of the seat back cushion will inherently be moved downwardly as the rear portion of the seat cushion is moved downwardly, consequently greatly limiting relative movement between these members. It will also readily become clear that due to the resilient support provided for the rear portion of the seat cushion construction the resiliency of the cushion will be greatly enhanced, at the same time not increasing relative movement between the seat cushion and seat back. Further, it will be clear that the construction is relatively simple and one which facilitates the removal of the seat cushion as may be desired without in any manner disturbing the slings which serve to support this seat cushion. The construction and arrangement of the slings 30 and support springs 35 are preferably such that when an occupant of normal weight is seated in the seat construction shown the slings will still maintain substantial clearance from the bottom of the seat pan and consequently the entire support for the rear portion of the seat cushion will be provided by the slings 30 and supporting springs 35, thus making available this resilient support for the seat cushion at all times and under all circumstances. It will be appreciated that the seat cushion construction provided in this invention is extremely resilient, inasmuch as the occupant is supported not only by the resiliently mounted slings, but also by the inherent resiliency of the seat cushion.

While but one embodiment of the invention has been illustrated and described, it will be readily understood that this embodiment is merely illustrative of the generic inventive concept of this invention. Many other and further modifications falling within the scope of the invention as defined in the subjoined claims will be clearly apparent to those skilled in the art.

What is claimed is:

1. A seat construction for vehicle bodies comprising a relatively rigid seat back frame, a border frame resiliently mounted thereon in spaced relation thereto, L-shaped slings anchored at their forward end and secured to the top edge of said border frame at their other ends, and a seat cushion removably mounted upon said slings.

2. A seat construction for vehicle bodies comprising a seat back frame, a border frame resiliently mounted thereon in forwardly spaced relation thereto, L-shaped slings suspended from the top edge of said border frame, resilient means serving to support said slings with respect to said seat back frame, and a seat cushion removably mounted on said slings.

3. A vehicle seat construction comprising a seat back cushion having a rigidly mounted base frame and a border frame resiliently mounted in spaced relation thereto, a seat pan, upstanding pins adjacent the forward edge of said seat pan, slings connected to said border frame of said seat back cushion at one of their ends and anchored to said pins at the other of their ends, a seat cushion removably supported by said slings.

4. A vehicle seat construction comprising a seat back cushion having a rigidly mounted base frame and a border frame resiliently mounted in spaced relation thereto, a seat pan, upstanding pins adjacent the forward edge of said seat pan, slings connected to said border frame of said seat back cushion at one of their ends and anchored to said pins at the other of their ends, a seat cushion removably supported upon said slings and disposed in cooperative relation with respect to said seat back, and resilient means interconnecting said slings and the base frame of said seat back cushion serving to maintain the rear portion of said slings in spaced relation with respect to said seat pan.

5. A vehicle seat construction comprising a seat back cushion having a rigidly mounted base frame and a border frame resiliently mounted in spaced relation thereto, a seat pan, upstanding pins adjacent the forward edge of said seat pan, slings connected to said border frame of said seat back cushion at one of their ends and anchored to said pins at the other of their ends, a seat cushion removably mounted upon said slings and disposed in cooperative position with respect to said seat back, and resilient means supporting the rear portion of said slings to maintain the rear portion of said seat cushion in resiliently spaced relation with respect to said seat pan.

6. A seat construction for vehicle bodies comprising a seat back cushion having a base frame and a border frame resiliently mounted thereon in spaced relation thereto, a seat pan, a seat cushion having its forward edge seated in the forward edge of said seat pan, and means connected to the border frame of said back cushion for supporting the rear portion of said seat cushion in spaced relation with respect to said pan.

7. A seat construction for vehicle bodies comprising a seat back cushion having a base frame and a border frame resiliently mounted thereon in spaced relation thereto, a seat pan, a seat cushion having its forward edge seated in the forward edge of said seat pan, means connected to the border frame of said back cushion for supporting the rear portion of said seat cushion in spaced relation with respect to said pan, and resilient means interconnecting said supporting means with the base frame of said seat back cushion.

8. A vehicle seat construction including a seat back and a seat cushion each comprising a base frame and a border frame resiliently connected thereto, means for rigidly mounting the base frame of said seat back, slings anchored at their forward ends against vertical movement, said slings extending rearwardly and then upwardly and having their upper ends anchored to the border frame of said seat back and capable of vertical movement relative to said forward ends, resilient means serving to resist downward movement of said slings, said seat cushion being removably mounted on said slings in cooperative relation with respect to said seat back.

9. A vehicle seat construction including a seat back and a seat cushion each comprising a base frame and a border frame resiliently connected thereto, means for rigidly mounting the base frame of said back, slings pivotally mounted upon rigid supporting means at their forward ends, said slings extending rearwardly and then upwardly and having their upper ends anchored to the border frame of said seat back cushion, springs resiliently interconnecting said slings with the base frame of said seat back cushion whereby to resist downward movement of said slings, said seat cushion being removably mounted on said slings in cooperative position with respect to said seat back.

FRANK M. SHANAHAN.